United States Patent [19]
Zicker

[11] Patent Number: 5,159,625
[45] Date of Patent: Oct. 27, 1992

[54] METHOD OF SELECTING THE CELLULAR SYSTEM WITH WHICH A CELLULAR MOBILE RADIOTELEPHONE COMMUNICATES

[75] Inventor: Robert G. Zicker, Houston, Tex.

[73] Assignee: GTE Mobile Communications Service Corp., Houston, Tex.

[21] Appl. No.: 603,816

[22] Filed: Oct. 24, 1990

[51] Int. Cl.⁵ .......................................... H04M 11/00
[52] U.S. Cl. ...................................... 379/59; 379/60; 455/33.2
[58] Field of Search ............................ 379/59, 60, 63; 455/31-33, 31.1, 32.1, 33.1, 33.2, 33.3, 33.4

[56] References Cited

U.S. PATENT DOCUMENTS

| | | | |
|---|---|---|---|
| Re. 32,115 | 4/1986 | Lockwood et al. | |
| 3,576,402 | 3/1971 | Baker | |
| 4,233,473 | 11/1980 | Frost | |
| 4,326,123 | 4/1982 | Hosterman | |
| 4,399,330 | 8/1983 | Kuenzel | |
| 4,411,017 | 10/1983 | Talbot | |
| 4,439,636 | 3/1984 | Newkirk et al. | |
| 4,517,412 | 5/1985 | Newkirk et al. | |
| 4,549,308 | 10/1985 | LoPinto | |
| 4,577,061 | 3/1986 | Katzeff et al. | |
| 4,595,983 | 6/1986 | Gehalo et al. | |
| 4,621,326 | 11/1986 | Rawlins | |
| 4,625,276 | 11/1986 | Benton et al. | |
| 4,675,863 | 6/1987 | Paneth et al. | |
| 4,706,275 | 11/1987 | Kamil | |
| 4,715,061 | 12/1987 | Norwich | |
| 4,727,569 | 2/1988 | Kutrieb et al. | |
| 4,731,818 | 3/1988 | Clark, Jr. et al. | |
| 4,776,003 | 10/1988 | Harris | |
| 4,777,646 | 10/1988 | Harris | |
| 4,831,647 | 5/1989 | D'Avello et al. | |
| 4,833,701 | 5/1989 | Comroe et al. | 379/60 |
| 4,860,336 | 8/1989 | D'Avello et al. | 379/63 |
| 4,860,341 | 8/1989 | D'Avello et al. | |
| 4,916,728 | 4/1990 | Blair | 379/59 |
| 5,020,091 | 5/1991 | Krolopp et al. | 379/59 |

OTHER PUBLICATIONS

"Advanced Mobile Phone Service: Control Architecture", *The Bell System Technical Journal*, Jan. 1979.
Motorola Brochure, America Series TM, Cellular Mobile Telephones, Model 220, Jan. 1989.

*Primary Examiner*—Curtis Kuntz
*Assistant Examiner*—Dwayne D. Bost
*Attorney, Agent, or Firm*—Lowell W. Gresham; Jordan M. Meschkow; Don J. Flickinger

[57] ABSTRACT

A remotely programmable cellular mobile radiotelephone (CMR 12) is configured to select (1300) a cellular system (14–16) with which to communicate while roaming. The CMR (12) utilizes a default system selection process. The system selected using this default process is identified (1302) and a SID list (1402) is checked to see if the system identification number (SID) of the identified system is on the list (1402). The SID list (1402) is maintained in a current state through remote programming sessions (1500). When the default system's SID is not on the list (1402), CMR (12) operation continues normally. When the default system's SID is on the SID list (1402), the default system selection process is replaced with an alternate system selection process (1316–1322). If a new system selected by the alternate process is not available or if a new system is available but listed on the SID list (1402), then the CMR (12) simulates a no service mode of operation (1332–1338). Simulation of a no service mode of operation ceases when an actual no service condition occurs (1222). If a new system selected by the alternate selection process is available and not listed on the SID list (1338), then operation on the new system is permitted. After a predetermined duration of operation on the new system, the default selection process is restored and the procedure repeats if necessary.

22 Claims, 12 Drawing Sheets

METHOD OF SELECTING THE CELLULAR SYSTEM WITH WHICH A CELLULAR MOBILE RADIOTELEPHONE COMMUNICATES

RELATED PATENTS

The present invention is related to:

1. "Remote Accessing System for Cellular Telephones," by Robert G. Zicker, et al., Ser. No. 07/518,774, U.S. Pat. No. 5,046,082, filed May 2, 1990, and assigned to the assignee of the present invention;

2. "Cellular Radiotelephone Credit Card Paystation Method," by Robert G. Zicker, et al., Ser. No. 07/602,698, filed Oct. 24, 1990, and assigned to the assignee of the present invention.

3. "Adaptable Vehicle Alarm Detection and Reporting System," by Robert G. Zicker, Ser. No. 07/603,815, filed Oct. 24, 1990 and assigned to the assignee of the present invention.

TECHNICAL FIELD OF THE INVENTION

The present invention relates generally to cellular mobile radiotelephones (CMRs). More specifically, the present invention is related to methods for operating remotely programmable CMRs to automatically select the foreign cellular systems with which the CMRs can communicate.

BACKGROUND OF THE INVENTION

Conventional cellular mobile radiotelephones (CMRs) are capable of communicating on at least one of two independent sets of frequencies. However, a conventional cellular base system communicates on only one of these two sets of frequencies. Thus, a cellular base system may be referred to as an "A" system if it uses one set of frequencies or a "B" system if it uses the other set of frequencies. This dual-system approach to radiotelephony results from regulations which are intended, at least in part, to promote competition in providing radiotelephone services. When A and B cellular systems are both located in a single geographic area, radiotelephone service customers may choose to subscribe to either the A or B system in accordance with which system provides the best value to the customer. B systems are often referred to as "wireline" carriers because B systems are typically operated by the companies that provide wireline telecommunication services where the B systems are located. A systems are often referred to as non-wireline carriers because they are operated by companies other than the companies that operate the competing B systems.

When a customer subscribes to a cellular system (either an A or B system), that system becomes the customer's home system. The company that operates a customer's home system collects billing information and bills the customer for the customer's use of the home system's radiotelephone services. Whenever a customer is operating his or her CMR on a system other than the customer's home system, the customer is engaging in an activity known as roaming. The cellular system upon which a roaming CMR is operating is viewed as a foreign system.

Customers may receive telecommunication services while roaming. However, the home system company and the foreign system company must cooperate with one another before roaming services are permitted. For example, the foreign system must transfer call record information to the home system, and the home system must bill for, collect funds for, and distribute funds back to the foreign system for the roaming telecommunication services. Accordingly, the customer must typically pay additional charges when the customer uses roaming services.

When the customer operates his or her CMR in the area covered by the CMR's home system, no serious cellular base system selection choice needs to be made. The customer will almost always want to use the home system because the charges for home-system telecommunication services will be less. On the other hand, when the customer is roaming away from the home system, a choice of whether to operate a CMR on an A or B foreign system must be made.

Conventional CMRs employ any one of several different programmable selection processes in choosing a cellular system upon which to operate. For example, a CMR may prefer an A system but accept a B system if an A system is not available. This is called an A/B selection process. Conversely, a CMR may prefer a B system but accept an A system if a B system is not available. This is called a B/A selection process. Alternatively, a CMR may select only A systems (A-Only) or only B systems (B-Only) regardless of whether a competing system is available. Furthermore, a CMR may select only the home system so that roaming is prohibited. Other selection processes may be implemented as well. A CMR will typically utilize a default selection process which is consistent with its home system. For example, if a CMR's home system is an A system, then the CMR will typically utilize the A-Only or A/B selection processes as a default selection process.

Conventional CMRs permit alteration of the default selection process. However, this feature is not often used by customers because it is difficult to accomplish through a CMR's handset and because an intelligent nondefault selection process setting requires an understanding of cellular radiotelephony that many customers do not possess. Accordingly, providers of cellular services recognize that, for the most part, customers do not alter the default process selection setting.

The default selection process setting tends to limit any benefits that competition between A and B systems may provide while roaming. While the default setting favors the home system, at the same time it favors approximately one half of the numerous potential foreign systems over the other half of potential foreign systems. Assuming that this default setting does not change, in providing radiotelephone services to roaming customers one of each foreign area's two competing cellular systems benefits from an equipment-caused bias. As a result, the favored foreign systems need not aggressively price roaming services, and they need not be exceptionally cooperative with a roamer's home system, because it is highly probable that a roamer will use the favored foreign system regardless of cost. Consequently, roaming costs to a customer remain undesirably high.

While conventional CMRs can be configured so that the default system selection process setting is easily alterable, such configurations do not solve the problems faced by roaming customers. A typical customer is not prepared to make, or interested in making, a purchasing decision with respect to telecommunication services every time he or she is roaming. While roaming, a customer is unlikely to know the rates charged by the competing foreign cellular systems. Moreover, the rate structures may be complicated, and they may change from time to time. Thus, when a customer is roaming, he or she typically does not possess sufficient information upon which to base an intelligent foreign cellular system selection decision, and typically does not desire to go to the time and trouble to obtain this information.

SUMMARY OF THE INVENTION

Accordingly, it is an advantage of the present invention that an improved CMR and method of operating a CMR to select a desirable foreign cellular system with which to communicate is provided. Through the present invention, CMRs may operate in accordance with a "mutual fund" for roaming telecommunication services. Purchasing decisions with respect to roaming telecommunication services may be made centrally for numerous CMRs configured in accordance with the present invention. The present invention will choose system selection processes which carry out the centrally-made purchasing decisions.

Another advantage of the present invention is that the method of the present invention adapts a remotely programmable CMR so that the CMR selects foreign cellular systems in accordance with data received periodically during remote programming sessions.

Another advantage of the present invention is that a method of operating CMRs is provided which restores competition in connection with telecommunication services provided to roaming cellular radiotelephone customers.

The above and other advantages of the present invention are carried out in one form by an improved method of operating a cellular mobile radiotelephone (CMR). The method causes the CMR to select which one of a plurality of frequency sets upon which to communicate. The CMR stores a list of system identification numbers (SIDs) that identify cellular systems for which cellular radiotelephone communication is to be prevented. The CMR detects and displays when it is roaming. When the CMR is roaming, the CMR obtains a SID for the foreign cellular system upon which the CMR is then-currently configured to operate. This foreign cellular system is selected in accordance with a first system selection process, and this foreign cellular system communicates upon a first one of the sets of frequencies. The CMR then determines whether the SID of this foreign cellular system is identified by the list of SIDs. When the SID is identified by the list, the method instructs the CMR to communicate upon a second one of the frequency sets.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
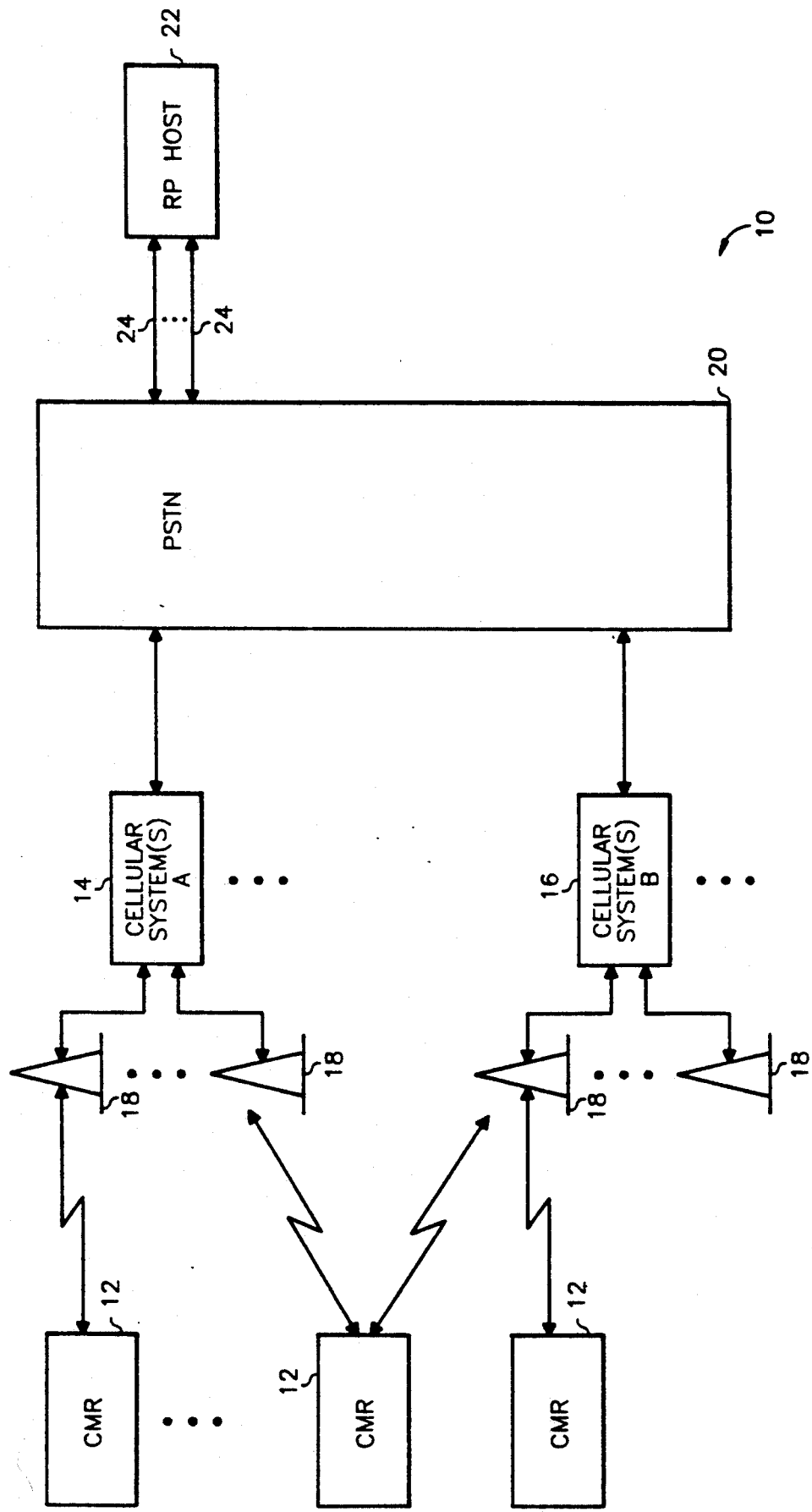
FIG. 1 shows a block diagram of a cellular radiotelephone system constructed in accordance with the present invention.

FIG. 1 shows a block diagram of a cellular radiotelephone system 10 within which the method of the present invention is practiced. System 10 includes a multiplicity of cellular mobile radiotelephones (CMRs) 12. The precise number of CMRs 12 is not a critical feature and may range from a few to many tens of thousands. As is conventional, each of CMRs 12 is capable of communicating with either an "A" type cellular system 14 or a "B" type cellular system 16. Those skilled in the art understand that A cellular systems communicate over a first set of predetermined frequencies while B cellular systems communicate over a second set of predetermined frequencies, the first and second sets being selected so that interference between the two sets is avoided.

Cellular systems 14 and 16 each include several spaced apart cells defined by antennas 18. Communication coverage over a geographic area is achieved through frequency channel manipulation between the cells. Moreover, both an A system 14 and a B system 16 may reside in a single geographic area. When a CMR 12 has subscribed to service at one of systems 14 and 16 in a single geographic area, that system is a home system for the CMR 12. The other of systems 14 and 16 in the home geographic area, and systems 14 and 16 located in all other geographic areas are foreign systems to the CMR 12. As is conventional, when CMR 12 is operating on a foreign system 14-16, CMR 12 is roaming.

All of A systems 14 and B systems 16, regardless of their designation as a home or foreign system, couple to and operate as an integral part of the public switched telecommunications network (PSTN) 20. PSTN 20 includes all the conventional cellular radio systems, cellular switching systems, trunks, satellites, and land-wired switching systems which are well known to those skilled in the art.

System 10 also includes a remote programming (RP) host 22, which couples to PSTN 20 through at least one, but preferably many, subscriber loops 24. RP host 22 is a computer system that remotely controls the programming of CMRs 12. Generally speaking, RP host 22 periodically engages in data communication sessions with CMRs 12. During such sessions RP host 22 and a CMR 12 exchange data. Thus, data tables, timing data, predetermined telephone numbers, modes of operation flags, virtually any item of application data, and executable machine code utilized within CMR 12 may be altered as a result of such sessions. Specific details of a preferred implementation of remote programming host 22 and its relation to remotely accessible cellular radiotelephones are provided in the above-listed related patent references.

Figure 2:
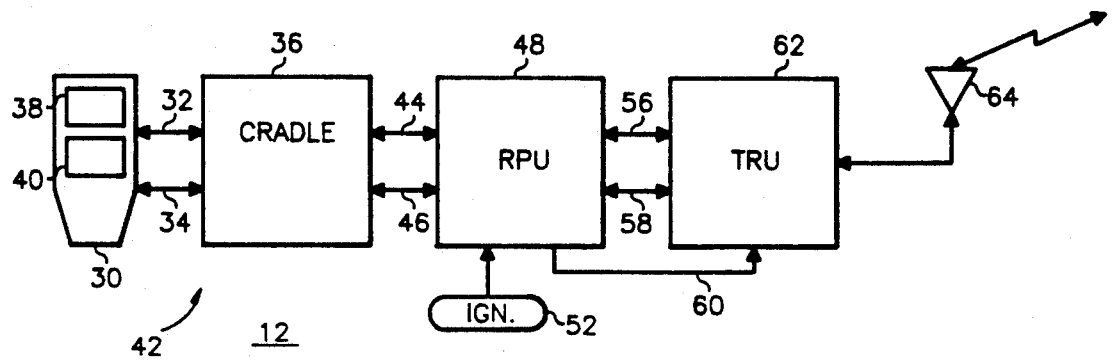
FIG. 2 shows a block diagram of a cellular mobile radiotelephone (CMR) used in connection with the system of the present invention.

FIG. 2 shows a block diagram of a preferred CMR 12 used in connection with system 10. CMR 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. In addition, an ignition input 52 to RPU 48 couples to the ignition of an automobile (not shown) in which CMR 12 is installed. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is conventional, an antenna 64 through which TRU 62 communicates with antennae 18 (see FIG. 1) also couples to TRU 62. RPU 48 may represent a kit which is installed between a conventional CU 42 and a conventional TRU 62 of a conventional CMR. The use of conventional CMR equipment as a platform to which remote programmability hardware is added reduces costs due to the mass production of such conventional equipment. Preferably, RPU 48 is physically mounted on CU 42.

Figure 3:
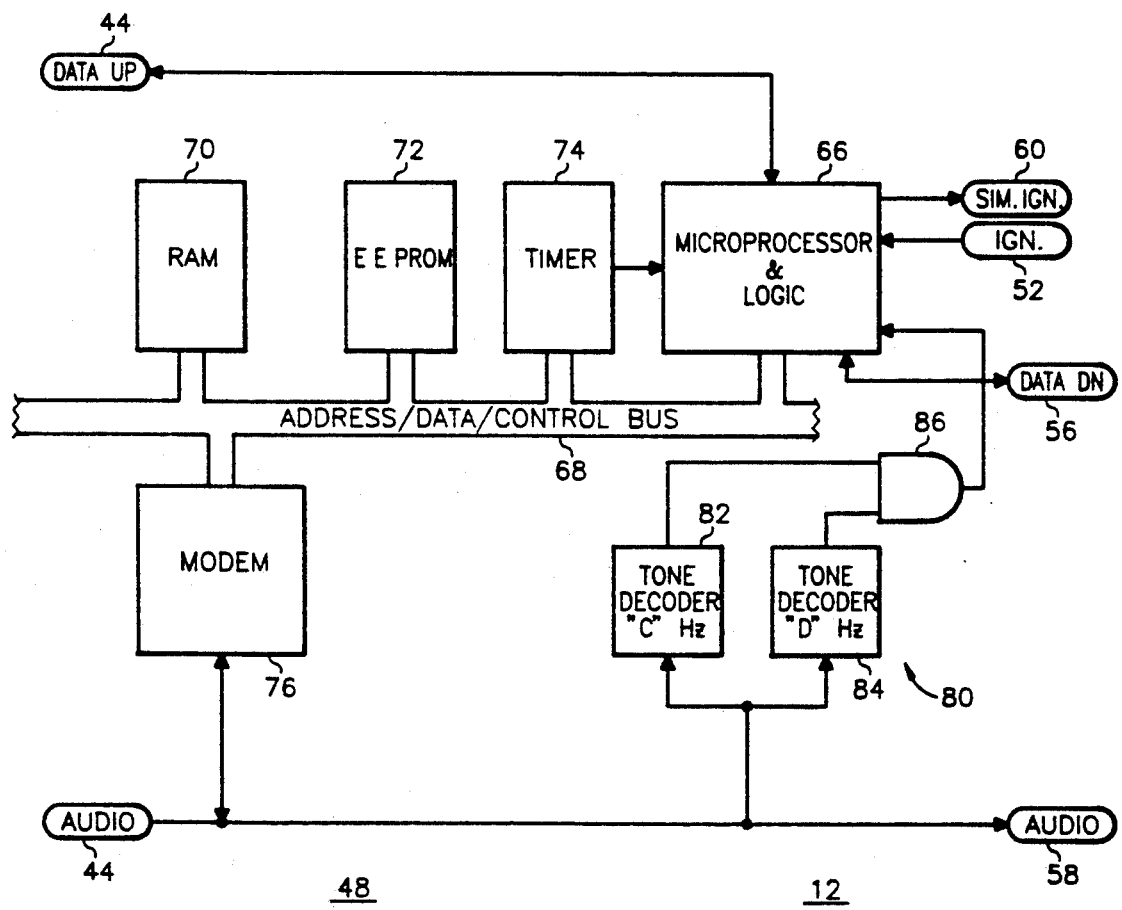
FIG. 3 shows a block diagram of a remotely programmable unit (RPU) portion of the CMR of the present invention.

FIG. 3 presents a block diagram of hardware included in a preferred RPU 48. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, and a data port of a modem 76. Those skilled in the art will understand that RAM 70 is one example of a volatile read-write type of memory, and battery-backed-up RAM and other memory devices may serve as non-volatile read-write memory 72. An audio port of modem 76 is additionally coupled to audio bus 58, and timer 74 preferably is coupled to an interrupt input of section 66.

Microprocessor and logic section 66 generally controls the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which CMR 12 is installed is "off".

Modem 76 represents a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detect, are communicated to and from microprocessor section 66 through bus 68. On the other hand, ring detect is detected by microprocessor section 66 by monitoring data commands on serial data bus 56.

Section 66 senses the state of ignition signal 52. In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Section 66 also provides a control output bit, which is coupled to simulated ignition signal 60. The conventional TRU 62 (see FIG. 2) senses this simulated ignition signal in lieu of ignition signal 52, that it would otherwise sense in a conventional CMR installation. Simulated ignition signal 60 responds to both the state of ignition signal 52 and to the date and time data maintained in conjunction with timer 74. Hence, RPU 48 causes conventional TRU 62 to alter its conventional operation in accordance with the method of the present invention, discussed below.

Signal detection circuit 80 is configured to detect a predetermined login audio tone. In the preferred embodiment, this login tone includes two predetermined frequencies, labeled as "C" and "D" in FIG. 3. Frequencies C and D are selected so that the login tone is as unique as possible within normal telecommunication. In other words, the login tone is unlikely to be present during normal telecommunication operations, other than in a login procedure, an example of which is discussed in the above-listed related patents.

The method of the present invention is practiced, at least in part, by RPU 48. As discussed above, CU 42 and TRU 62 (see FIG. 2) are provided by conventional nonremotely programmable cellular radiotelephone equipment. Specifically, in the preferred embodiment, a cellular telephone manufactured by the OKI corporation as model EM-23 serves as CU 42 and TRU 62. Generally speaking, microprocessor and logic section 66 of RPU 48 practices this method by executing programming instructions stored in memories 70-72. This method involves, at least in part, the processing of data to control the operation of system 10 (see FIG. 1). Some of the specific processing tasks performed by the preferred embodiment are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Figure 4:
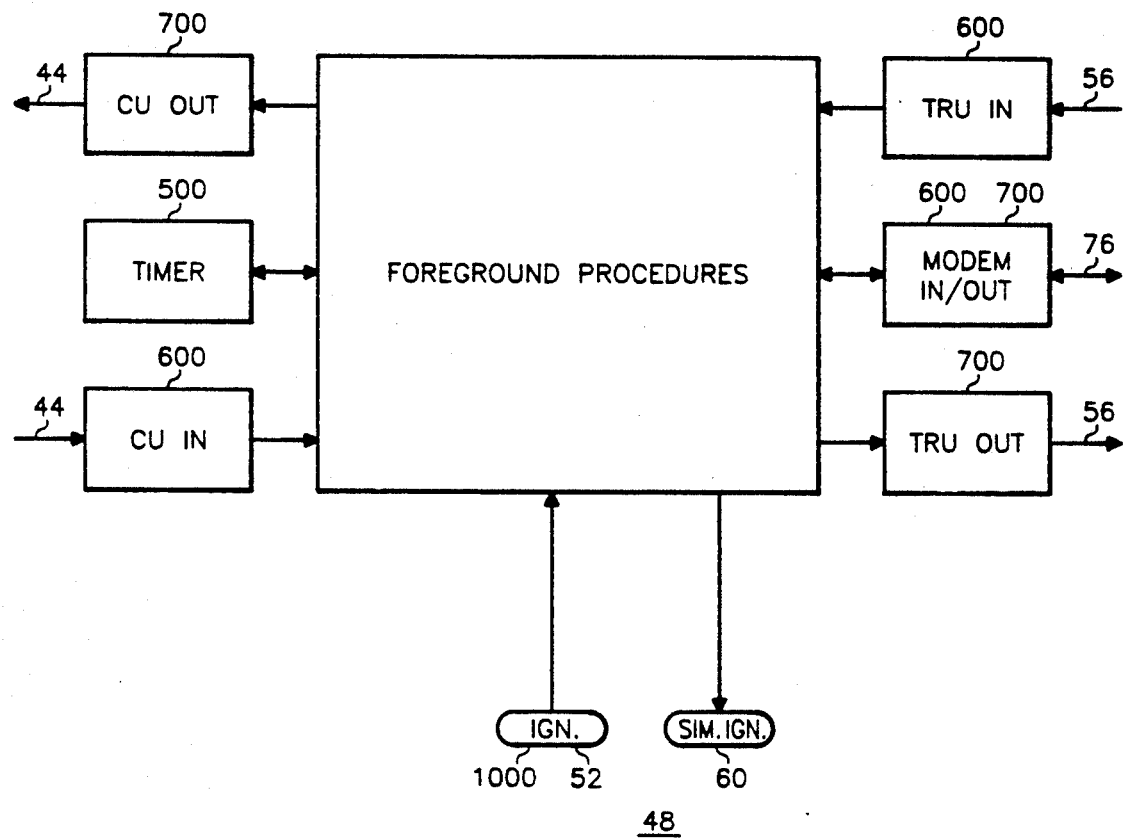
FIG. 4 shows a block diagram of data flow into and out from the RPU portion of the present invention.

With respect to the data processing performed by RPU 48, FIG. 4 shows a block diagram of data flow into and out of RPU 48. Generally speaking, the flow of this data is controlled by various background software procedures.

RPU 48 receives data concerning date and time through the operation of a timer background procedure 500, which is described in more detail below in connection with FIG. 5.

Input background procedures serve to manage the reception of serial data from serial data busses 44 and 56, and through modem 76. The input background procedures generally place data received at RPU 48 into appropriate queues so that they may be processed by various foreground software procedures, which are discussed below in connection with FIGS. 8-15. As shown in FIG. 4, there are three input background interrupt procedures: CU-In, TRU-In, and Modem-In. All three procedures operate similarly. Thus, to show these various data input roles, a generic input background procedure 600 is discussed below in connection with FIG. 6.

Likewise, output background procedures coordinate the transmission of data on to data busses 44 and 56 and through modem 76. The output background procedures retrieve data placed in their queues by the various foreground software procedures and cause the data to be transmitted at an appropriate port. The three output background procedures CU-Out, TRU-Out, and Modem-Out shown in FIG. 4 are similar to one another. Thus, to show these various data output roles, a generic background data output interrupt procedure 700, is discussed below in connection with FIG. 7.

In addition, foreground procedures monitor ignition input signal 52 and set or reset the output signal which serves as simulated ignition signal 60.

Figure 5:
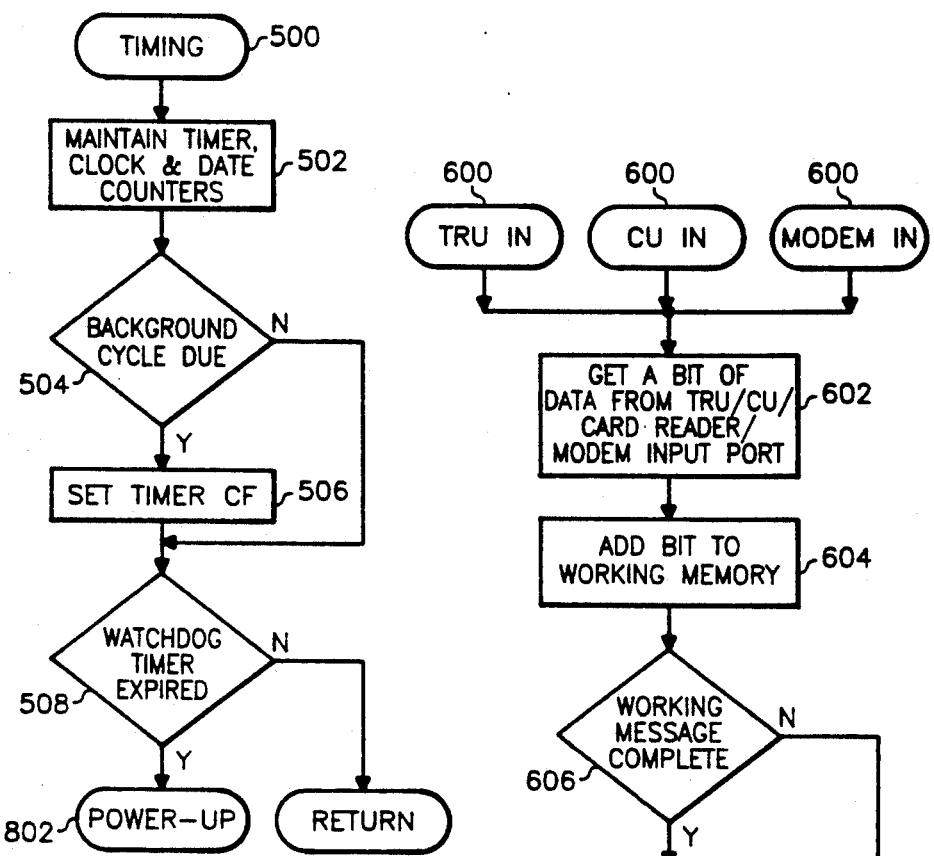
FIG. 5 shows a flow chart of a timing interrupt routine performed by the RPU portion of the present invention.

Background timing procedure 500, shown in FIG. 5, is performed by microprocessor section 66 and timer 74 of RPU 48 (see FIG. 3) in response to an interrupt generated by timer 74. This interrupt occurs on a regular basis, such as once every few milliseconds. As shown in a task 502, timing procedure 500 maintains timer, clock, alarm, and date counters so they remain current. As discussed above, even when vehicle ignition is removed, microprocessor section 66 and timer 74 remain energized so that the timers, clocks, and date counters operate even when TRU 62 and other portions of CMR 12 (see FIG. 2) are de-energized.

An inquiry task 504 of procedure 500 inquires whether the clock counter contains a value which indicates that a background application procedure 1000 (discussed below in connection with FIG. 10) should be activated. Background application procedure 1000 is actually a foreground procedure which is used to perform tasks similar to those performed in background procedures. In the preferred embodiment, procedure 1000 is activated once every several milliseconds, at a rate which is considerably slower than the performance of timing procedure 500. When the cycle for background application procedure 1000 is due, a task 506 sets a Timer condition flag (CF). The method of the present invention uses numerous condition flags, and the discussion below refers to such condition flags by the acronym "CF". The timer CF eventually causes the foreground procedures to perform procedure 1000, in a manner discussed below in connection with FIGS. 8-9.

Procedure 500 additionally includes an inquiry task 508, which monitors the one of its counters that is serving as a watchdog timer. If this counter has reached a predetermined value, a catastrophic type of timeout condition has occurred. When this happens, program control is transferred to a power-up task 802, discussed below in connection with FIG. 8. However, so long as this watchdog timer has not expired, timing procedure 500 returns to the procedure being executed when the timer interrupt was initially received.

Figure 6:
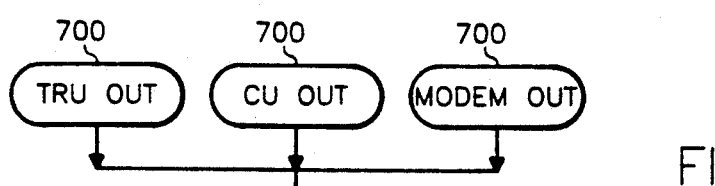
FIG. 6 shows a flow chart of data input interrupt routines performed by the RPU portion of the present invention.

As discussed above, background input data procedure 600, flow chart shown in FIG. 6, illustrates the tasks used by each of CU-In, TRU-In, and Modem-In procedures shown in FIG. 4. Procedure 600 is invoked whenever a bit (or byte in the case of the Modem-In procedure) of data has been received. A task 602 gets a bit of data from an appropriate input port. For the CU-In procedure, this input port is the one coupled to serial data bus 44 (see FIG. 4); for the TRU-In procedure, the input port is the one coupled to serial data bus 56; and, for the Modem-In procedure, the input port is the one coupled to Modem 76 (see FIG. 3).

After task 602, a task 604 adds the bit or byte of received data to a working message, and an inquiry task 606 determines whether the working message is complete. When the received data is an entire byte of data, the message may be complete upon each reception. However, when data is received one bit at a time, the bits are collected until an entire message has been received. When the working message is not yet complete, data input procedure 600 simply causes program control to return to the procedure that was being executed when procedure 600 was initially invoked.

On the other hand, when task 606 discovers that the working message is complete, a task 608 moves the completed message to an appropriate queue and clears the working message to make buffer space for a subsequent input. For CU-In and TRU-In procedures, the message receiving queues are input queues for forward command (FCMD) and reverse command (RCMD) application procedures 1100 and 1200, respectively. FCMD and RCMD application procedures 1100 and 1200 are discussed below in connection with FIGS. 11 and 12, respectively. Along with moving the completed message to an appropriate queue, task 608 also sets appropriate condition flags (CFs) to signal the presence of the input message. For CU-In and TRU-In procedures, RCMD_Queued and FCMD_Queued CFs, respectively, are set. For the Modem-In procedure, a Modem_Queued CF is set.

Figure 7:
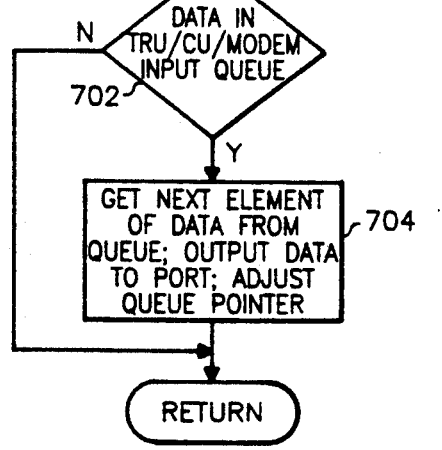
FIG. 7 shows a flow chart of data output interrupt routines performed by the RPU portion of the present invention.

As discussed above, background output data procedure 700, flow chart shown in FIG. 7, illustrates the tasks used by each of CU-Out, TRU-Out, and Modem-Out procedures. Procedure 700 is invoked whenever a bit (or byte in the case of the Modem-Out procedure) is ready for output. The preferred embodiment of the present invention invokes CU-Out and TRU-Out procedures once every 800 microseconds, and this rate is determined from a timing signal mixed with data presented on serial data busses 44 and 56. Accordingly, data transmissions among TRU 62, RPU 48, and CU 42 remain synchronized with one another.

In an inquiry task 702, procedure 700 determines whether data is present in the appropriate input queue for procedure 700. If data is available, a task 704 removes the next data element (either a bit or a byte) from the queue and outputs the data element to the appropriate port. Of course queue pointers and data element counters are adjusted so that the subsequent data element will be output next and so that freed up queue space may be utilized for receiving additional data. After task 704 and when task 702 determines that no data is available in its queue for output, procedure 700 causes program control to return to the procedure that was being executed when procedure 700 was initially invoked.

Figure 8:
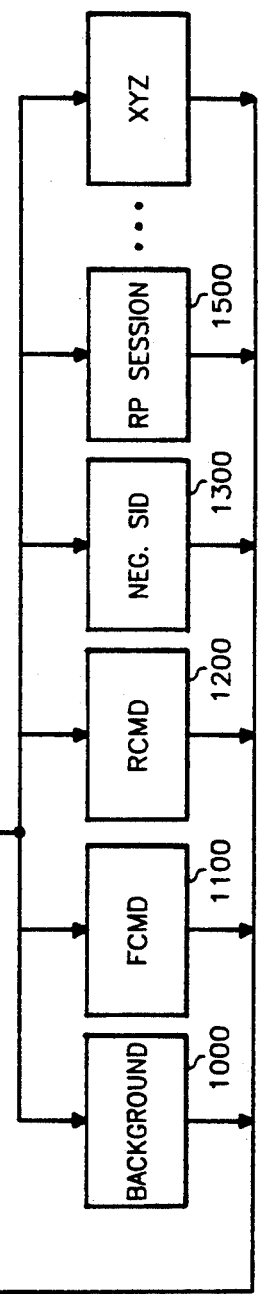
FIG. 8 shows a flow chart of an executive procedure performed by the RPU portion of the present invention.

As discussed above, FIGS. 8-15 present information related to foreground procedures performed by the present invention. Generally speaking, these foreground procedures consist of several application procedures that are managed by an executive 800. FIG. 8 shows a flow chart of executive 800. The application procedures are configured so that once they are invoked, they relinquish control back to the executive within a short period of time, whether or not they have completed their execution. Executive 800 then determines which of the application procedures is activated for execution and which has the highest priority among those that are activated. Of course, the background procedures discussed above may be invoked at any time during operation of executive 800 or during operation of the application procedures.

With reference to FIG. 8, executive 800 includes the power-up task 802 that was discussed above in connection with FIG. 5. Task 802 initializes the operation of RPU 48. This initialization includes the resetting of condition and other flags, the disabling of alarms and timers, and the initialization of variables. One of the variables initialized is an Original_Selection_Setting variable. This variable is initialized by queuing an appropriate command at the TRU-Out procedure discussed above in connection with FIG. 7. The TRU-Out procedure will eventually send the command to TRU 62 (see FIG. 2). When TRU 62 receives this command, it will respond by sending a message toward CU 42 (see FIG. 2). This message will contain a data code that identifies the system selection process currently employed by TRU 62 in choosing either an A system 14 or a B system 16 to operate upon. However, this message will be intercepted by RPU 48 and not reach CU 42. The TRU-In procedure discussed above in connection with FIG. 6 will receive the message, and place it in a queue for an RCMD application procedure 1200, discussed below in connection with FIG. 12. As discussed below, RCMD procedure 1200 places this data in a buffer. While the this message is being obtained, executive 800 waits in task 802. Once it arrives, it is stored in the Original_Selection_Setting variable. Upon completion of task 802, CMR 12 is prepared for operation in accordance with the method of the present invention.

After task 802, a task 804 resets the watchdog timer. In resetting the watchdog timer, program control must return to task 804 prior to expiration of the watchdog timer or timer procedure 500 (see FIG. 5) will force a power-up reset to occur. Task 804 also determines which of the application procedures is activated, and of those which are activated, which one has the highest priority.

Figure 9:
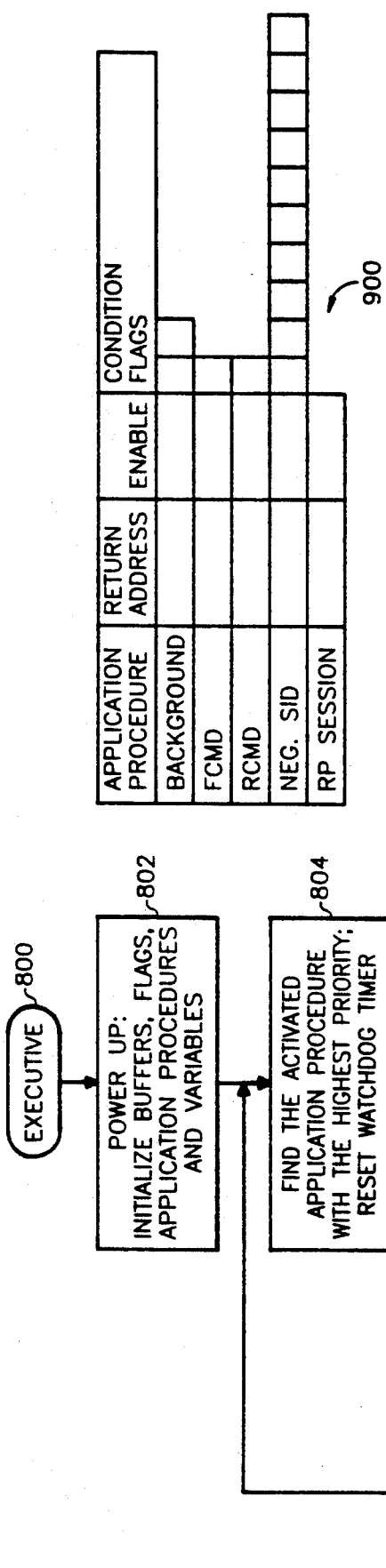
FIG. 9 shows a diagram of a data structure used by the executive procedure in routing program control to various application procedures performed by the RPU portion of the, present invention.

Executive 800 constructs and maintains data structure 900, which is illustrated in FIG. 9, to aid in making this determination. Data structure 900 includes several data elements associated with each of the application procedures. One data element is used to indicate the address at which program control should be routed when the application is next invoked. During the power-up initialization of task 802, these addresses are set to the respective beginnings of the application procedures. However, during operation of the present invention, they may change as the application procedures are performed. Another data element indicates whether the application procedure is enabled. If an application procedure is disabled, it cannot be considered activated. However, if an application procedure is enabled, it is considered activated only when at least one of the associated condition flags (CFs) are set. Additional flags may also be included to indicate whether particular condition flags are enabled so that they may be considered, or not. Accordingly, data structure 900 also associates an identification of various condition flags with each application procedure.

The data elements in data structure 900 may advantageously be arranged so that a prioritization scheme is implied. Thus, task 804 of executive 800 may simply examine the "enable" and "condition flag" data elements in a predetermined order wherein the first activated application procedure encountered automatically has a higher priority than all other activated application procedures. As shown in switching task 806, program control is then switched to the selected application procedure at the address associated in data structure 900 with the selected application procedure.

Executive 800 may route program control to any one of: 1) background procedure 1000, 2) FCMD procedure 1100, 3) RCMD procedure 1200, 4) Neg SID procedure 1300, 5) RP session procedure 1500, or other application procedures which are not related to the present invention. Each of these procedures returns program control to executive 800. Upon return, a task 808 saves an appropriate return address of the previously invoked procedure at the appropriate location within data structure 900.

Figure 10:
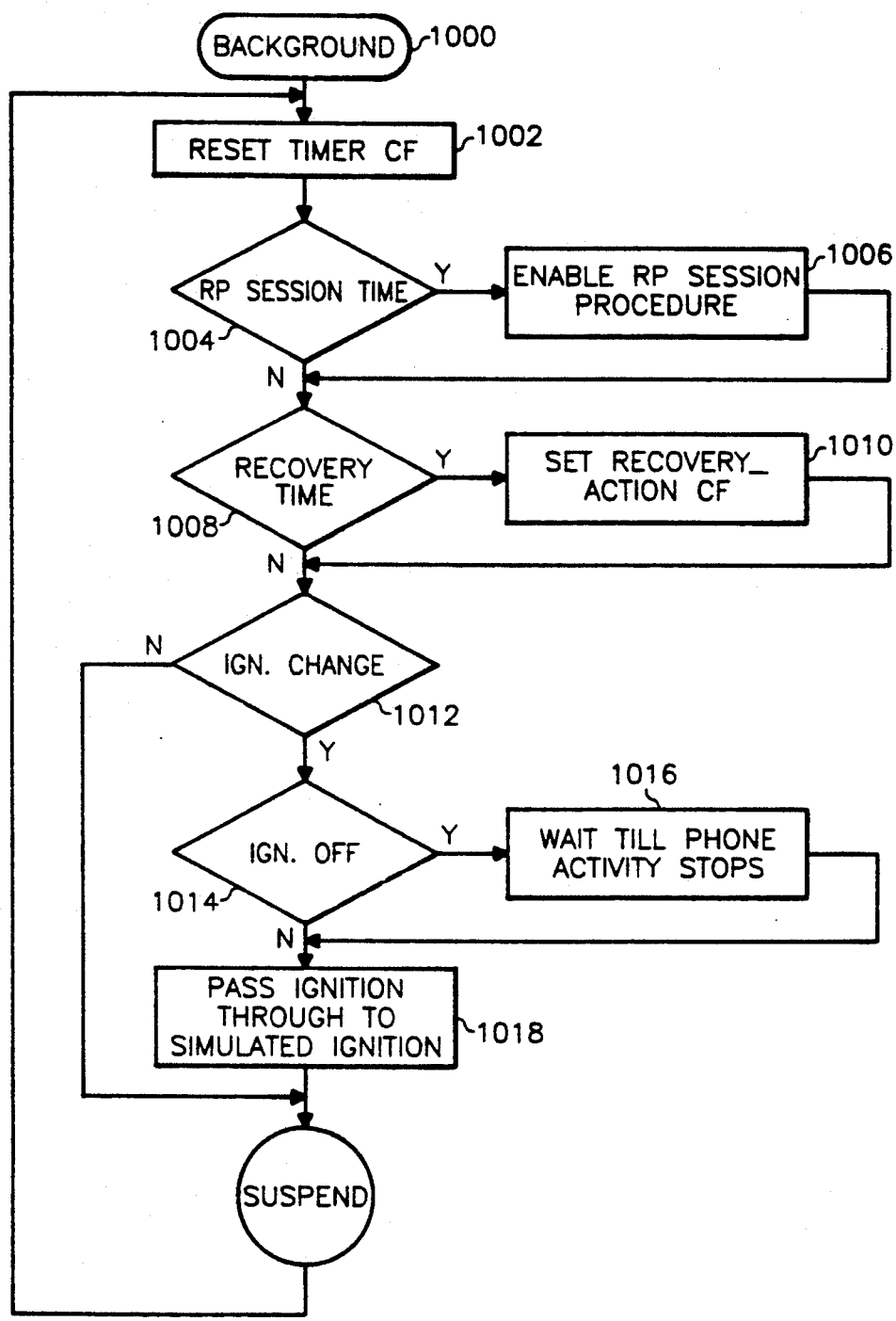
FIG. 10 shows a flow chart of a background application procedure performed by the RPU portion of the present invention.

FIG. 10 shows a flow chart of background application procedure 1000. As mentioned above, background application procedure 1000 performs tasks similar to tasks performed by the background procedures discussed above in connection with FIGS. 5-7. Such tasks relate to the monitoring of timing and external inputs.

With reference to FIG. 10, a task 1002 resets the timer CF. As discussed above in connection with FIG. 5, the timer CF was set when timer procedure 500 determined that it was time to activate background application procedure 1000. This condition was signalled by setting the Timer CF. Upon power-up, data structure 900 (see FIG. 9) was modified to indicate that background application procedure 1000 was enabled. Thus, when the Timer CF was set, executive 800 (see FIG. 8) caused program control to switch to procedure 1000. By resetting the Timer CF in task 1002, procedure 1000 will not be again invoked until the next time procedure 500 determines that it should be invoked.

Procedure 1000 additionally includes an inquiry task 1004 that determines whether it is time to engage in a remote programming session. Remote programming sessions occur on a periodic basis in a manner determined by programming within memory 72 of RPU 48 (see FIG. 2). Generally speaking, task 1004 compares the current date and time, maintained by timer procedure 500, with a stored value. If the current date and time equals or exceeds the stored value, a task 1006 enables RP session application procedure 1500 by setting the appropriate enabling data element in data structure 900 (see FIG. 9).

After task 1006 or when task 1004 determines that it is not now time for an RP session, an inquiry task 1008 performs a determination similar to that discussed above for task 1004. However, task 1008 determines whether it is time to take recovery action with respect to Neg SID procedure 1300. Generally speaking, Neg SID procedure 1300 (see FIG. 8) may occasionally alter the original or default selection process that TRU 62 uses to choose whether to operate upon an A or B cellular system. Recovery action is undertaken to re-evaluate the selection process used in connection with choosing a cellular system. Task 1008 determines whether it is time to take recovery action by comparing the current date and time with a variable that is set to indicate when or if recovery action should take place. If the current date and time equals or exceeds the variable, a task 1010 sets a Recovery_Action CF. Eventually, executive 800 (see FIGS. 8–9) will sense the setting of the Recovery_Action CF and switch program control to Neg SID procedure 1300 so that recovery activity may take place.

After task 1010 or when task 1008 determines that it is not now time for recovery action, an inquiry task 1012 determines whether the ignition of the vehicle has recently changed states. This determination may be performed by comparing an ignition status flag with the current ignition signal 52 (see FIGS. 2–4). The ignition status flag records a previously detected ignition state, and if ignition signal 52 differs from this recorded state, then a change has occurred. When an ignition change has occurred, an inquiry task 1014 determines whether the new state is the "off" state. If the "off" state is detected, procedure 1000 is halted or suspended until all telephone activity which may be in progress halts in a task 1016. After task 1016 or when the ignition is "on", the ignition signal is passed through to the simulated ignition signal in a task 1018.

As shown in FIG. 10, when the ignition has not changed at task 1012, and after task 1018, program control suspends operation in procedure 1000 and returns to executive 800. Upon the next return to procedure 1000, program control will resume with task 1002, discussed above. The next return results from the setting of the Timer CF, discussed above.

Figure 11:
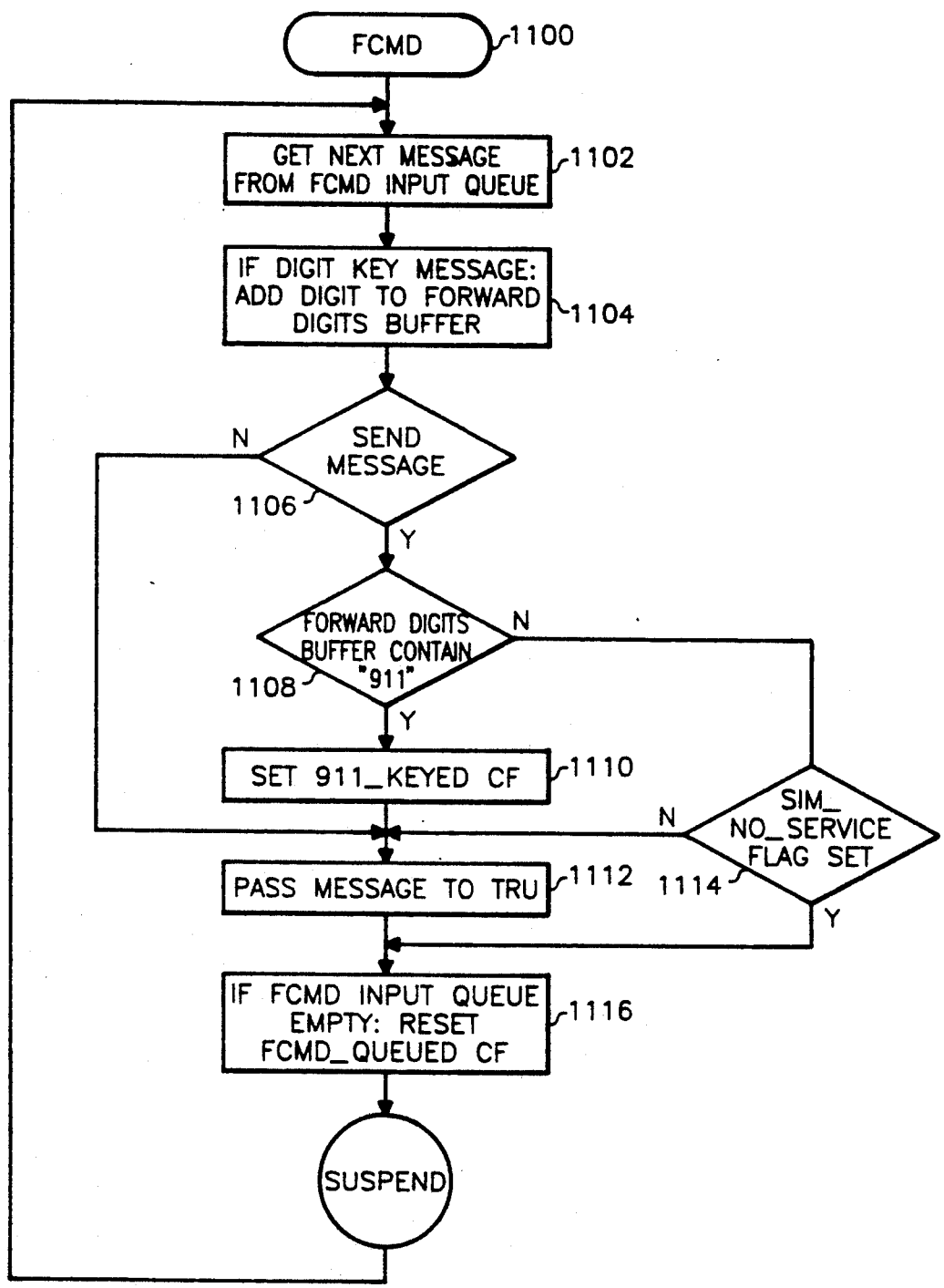
FIG. 11 shows a flow chart of a forward command (FCMD) application procedure performed by the RPU portion of the present invention.

FIG. 11 shows a flow chart of tasks performed within forward command (FCMD) application procedure 1100. FCMD procedure 1100 is performed when a message is received from CU 42 (see FIG. 2) and processed through the CU-In background procedure, discussed above in connection with FIG. 6. Generally speaking, FCMD procedure 1100 processes data messages traveling from CU 42 toward TRU 62 (see FIG. 2). Based on this processing, data in various buffers and various condition flags are maintained in a current form. In addition, FCMD procedure 1100 decides whether or not to pass such messages on to TRU 62.

With reference to FIG. 11, a task 1102 of FCMD procedure 1100 gets the next message present in its input queue. This message was placed there by background data input procedure 600, as discussed above in connection with FIG. 6. Next, a task 1104 examines this message to determine whether it indicates that a digit key has been pressed on keypad 40 of CU 42 (see FIG. 2). A digit key is associated with the numerals 0–9. If a digit key was pressed, task 1104 adds, or concatenates, the digit to any digits already in a forward digits buffer.

After task 1104, an inquiry task 1106 determines whether the message indicates that a "send" key of keypad 40 has been pressed. When the "send" key is pressed, an inquiry task 1108 examines the above-discussed forward digits buffer to see if the send key followed the digits "9-1-1." If a "send" followed a "911", then a task 1110 sets a 911_Keyed CF. Those skilled in the art will appreciate that the 911 telephone number represents an emergency number. The present invention permits placing 911 emergency calls even though service may be otherwise blocked, as discussed below.

If a send message followed the 911 digits, or if the message being processed by FCMD procedure 1100 is not a send message, a task 1112 passes the message through to TRU 62. Messages are passed to TRU 62 by placing them in an input queue for the TRU-Out procedure discussed above in connection with FIG. 7. When a 911 call is being placed, the passing of the send message to TRU 62 will cause the call to be placed.

On the other hand, when a send message does not follow the 911 digits, then additional investigation takes place before deciding whether to pass the send message on to TRU 62. Specifically, an inquiry task 1114 determines whether a Sim_No_Service flag, where "Sim" is short for "simulated", is set. The Sim_No_Service flag is set by Neg SID procedure 1300 (see FIG. 8) to force RPU 48 to simulate an unavailability mode of operating CMR 12. The unavailability mode of operation occurs when no cellular systems 14 or 16 (see FIG. 1) are available for communication. In other words, CMR 12 is out of service because no cellular base systems are within range of CMR 12. During the unavailability mode of operation, TRU 62 blocks transmissions from CMR 12. When the Sim_No_Service flag is set, FCMD procedure 1100 simulates this unavailability mode of operation by preventing send messages from reaching TRU 62. When TRU 62 fails to receive send messages, it does not produce transmissions.

However, when the Sim_No_Service flag is reset, program control permits task 1112 to pass the send message on to TRU 62. When task 1114 determines that the Sim_No_Service flag is set or after task 1112, a task 1116 updates the FCMD_Queued CF, which controls the invoking of FCMD procedure 1100. Specifically, when the FCMD input queue is empty, indicating that no more input messages are present for FCMD procedure 1100 to process, the FCMD_Queued CF is reset so that procedure 1100 will not be invoked again until such messages are present. Next, procedure 1100 is suspended, and program control returns to executive 800 (see FIG. 8).

Figure 12:
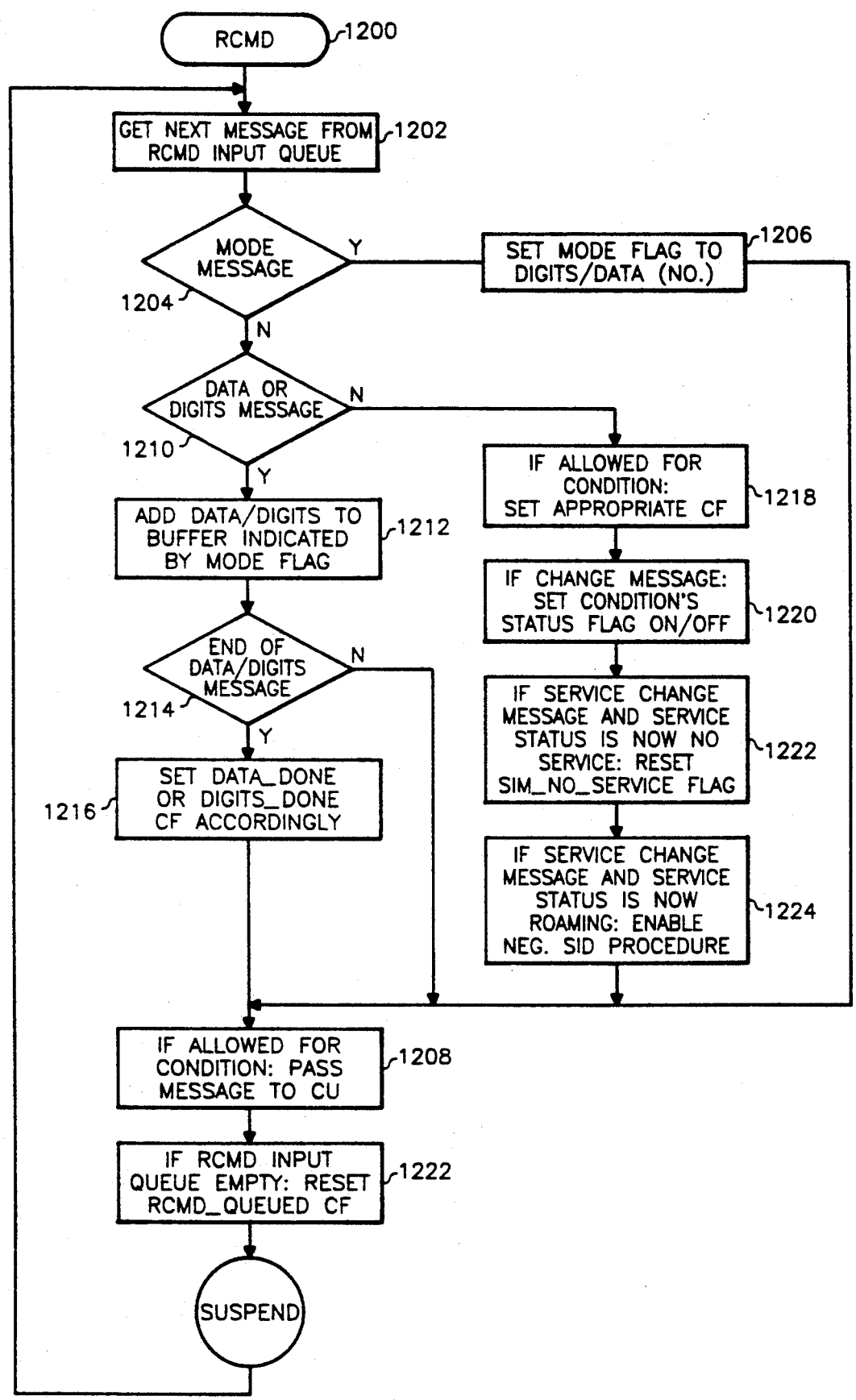
FIG. 12 shows a flow chart of a reverse command (RCMD) application procedure performed by the RPU portion of the present invention.

FIG. 12 shows a flow chart of tasks performed within reverse command (RCMD) application procedure 1200. RCMD procedure 1200 is performed when a message is received from TRU 62 (see FIG. 2) and processed through background procedure 600, discussed above in connection with FIG. 6. Generally speaking, RCMD procedure 1200 processes data messages traveling from TRU 62 toward CU 42 (see FIG. 2). Based on this processing, data in various buffers and various condition flags are maintained in a current form. In addition, RCMD procedure 1200 decides whether or not to pass such messages on to CU 42. In addition to FIG. 12, TABLE I, presented below, describes the operation of RCMD procedure 1200.

TABLE I

| RCMD Condition | Condition Flag | Pass Message |
|---|---|---|
| Service Change Message | Service_Change | $Y^A$ |
| In Use Change Message | In_Use_Change | Y |
| Mode Message | — | $Y^B$ |
| Data/Digit Message | — | $Y^B$ |
| Ring Message | — | $Y^C$ |
| Other Message | — | Y |

TABLE I-continued

| RCMD Condition | Condition Flag | Pass Message |
| --- | --- | --- |
| Data Complete Condition | Data_Done | — |

A - If Sim_No_Service flag is set AND 911_Keyed CF is reset, all Service Change Messages are changed to indicate a no service condition.
B - Not passed if Block_Message flag is set.
C - Not passed to CU if Sim_No_Service flag is set.

With reference to FIG. 12 and TABLE I, a task 1202 of RCMD procedure 1200 gets the next message present in its input queue. This message was placed there by the TRU-In background data input procedure discussed above in connection with FIG. 6. Next, an inquiry task 1204 examines this message to determine if it is a mode message. A mode message identifies the type of data to be communicated in subsequent messages. For example, such subsequent messages may communicate dialed digits or other numbers, such as a system identification number (SID) or a code that identifies the system selection process being used by TRU 62. When a mode message is encountered, a task 1206 sets a Mode flag in accordance with the contents of the mode message, and program control proceeds to a task 1208, discussed below.

When task 1204 determines that the message is not a mode message, an inquiry task 1210 determines whether the message represents numeric data, such as a SID, or dialed digits. When RCMD procedure 1200 encounters such data or digits, a task 1212 adds, or concatenates, the data or digits to a buffer which is selected in accordance with the Mode flag, discussed above. After task 1212, an inquiry task 1214 further determines whether the data or digits message is an ending message. When task 1214 detects the end of the data or digits, a task 1216 sets the appropriate one of Data_Done or Digits_Done CFs. Whether or not the data/digits message represents an ending message, program control then proceeds to task 1208, discussed below.

Of course, those skilled in the art will recognize that the particular data communication format utilized in the preferred embodiment to transmit numbers, such as dialled digits, system identification number (SID), mobile identification number (MIN), electronic serial number (ESN), and the like, may be unique to the OKI cellular telephone equipment with which the preferred embodiment of the present invention operates. Nevertheless, other conventional cellular TRU and CU equipment communicate similar numeric information, although data formats may differ. Those skilled in the art will be able to adapt the teaching of the present invention to accommodate the identification of such information, whether or not the above-discussed data format is utilized.

With reference back to task 1210, when the message being processed by RCMD procedure 1200 is not a data/digits message, a task 1218 sets appropriate CFs for the message. TABLE I lists messages for which CFs are set in task 1218 and the names utilized herein to describe such CFs. In addition, a task 1220 sets the condition's status flag appropriately when the message signals a change condition. For example, an In Use Change message represents one change condition. Task 1220 determines whether the new status is "in use" (on) or "not in use" (off). Task 1220 then sets an In_Use_Status flag to indicate the correct "on" or "off" status.

After task 1220, a task 1222 occasionally resets the Sim_No_Service flag. Specifically, when RCMD procedure 1200 is processing a service change message and that message indicates a change to a no service status of operation (i.e. no cellular system available for communication), task 1222 resets the Sim_No_Service flag.

The no service status of operation detected in task 1222 is referred to as an unavailability mode of operation, or an actual no service condition. This mode of operation differs from the simulated no service condition which occurs when the Sim_No_Service flag is set. During the unavailability mode of operation, TRU 62 prevents transmissions from CMR 12, and TRU 62 sends service change messages toward CU 42 which, if received by CU 42, cause CU 42 to display "no service" indications on display 38 (see FIG. 2). During the simulated no service condition, TRU 62 operates as if service is available. Accordingly, TRU 62 will transmit if instructed to do so and TRU 62 sends messages toward CU 42 which, if received by CU 42, would cause CU 42 to display a message indicating that service was available. However, as discussed below in connection with task 1208, such messages are altered before reaching CU 42 during the simulated no service condition. Thus, task 1222 causes the actual no service condition of operation to take precedence over the simulated no service condition of operation.

After task 1222, a task 1224 occasionally enables Neg SID procedure 1300 (see FIG. 8). Specifically, when RCMD procedure 1200 is processing a service change message and that message indicates that CMR 12 is now roaming on either an A or B system, task 1224 enables Neg SID procedure 1300. By enabling Neg SID procedure 1300, executive 800 (see FIG. 8) will eventually route program control to Neg SID procedure 1300.

After task 1224, program control proceeds to task 1208. Task 1208 selectively passes the message being processed by this iteration of RCMD procedure 1200 toward CU 42. TABLE I lists the messages and conditions which cause task 1208 to pass a message on toward CU 42. As shown in TABLE I, task 1208 alters all service change messages passed to CU 42 during the simulated no service condition of operation. Thus, during the simulated no service condition of operation CU 42 displays the same messages as it displays during the actual no service condition, or unavailability mode, of operation. Messages are passed to TRU 62 by placing them in an input queue for the CU-Out procedure, discussed above in connection with FIG. 7.

After task 1208, a task 1226 updates the RCMD_Queued CF, which controls the invoking of RCMD procedure 1200. Specifically, when the RCMD input queue is empty, indicating that no more input messages are present for RCMD procedure 1200 to process, the RCMD_Queued CF is reset so that RCMD procedure 1200 will not be invoked again until such messages are present. Next, procedure 1200 is suspended and program control returns to executive 800 (see FIG. 8).

As discussed above, RCMD procedure 1200 detects when CMR 12 is roaming by monitoring messages sent by TRU 62 toward CU 42. When CMR 12 initially enters a roaming state, RCMD procedure 1200 enables Neg SID procedure 1300. Executive 800 (see FIGS. 8-9) then routes program control to Neg SID procedure 1300 as soon as possible.

Generally speaking, Neg SID procedure 1300 cooperates with processes performed by conventional TRU 62 (see FIG. 2) in selecting which of A cellular system 14 or B cellular system 16 (See FIG. 1) to communicate upon. In particular, TRU 62 utilizes a conventional default process to perform this selection. This default process may favor an A system but accept a B system if an A system is not available (A/B process). It may favor a B system but accept an A system if a B system is not available (B/A process). Alternatively, the default process may select only an A system (A-Only) or only a B system (B-Only) regardless of whether a competing system is available. Furthermore, the default process may use other processes to select a cellular system upon which to operate. For example, the default process may select only the home system to operate upon. However, this process would prevent roaming, and if this process were programmed for CMR 12, RCMD procedure 1200 would never detect a roaming state, and Neg SID procedure 1300 would never be performed.

As discussed above in connection with task 802 of FIG. 8, RPU 48 initializes an Original_Selection_Setting variable to identify the default, or original, process TRU 62 performs in selecting a cellular system to operate upon. TABLE II, presented below, defines conditions under which, and the manner in which, Neg SID procedure 1300 alters the process TRU 62 performs in selecting a cellular system to operate upon.

TABLE II

| Service | | Original System Selection Setting | | | | |
|---|---|---|---|---|---|---|
| A | B | A/B | B/A | A Only | B Only | Other |
| X | X | Ignore | Ignore | Ignore | Ignore | Ignore |
| X | + | Allow | Allow | Ignore | Allow | Ignore |
| + | X | Allow | Allow | Allow | Ignore | Ignore |
| + | + | Allow | Allow | Allow | Allow | Ignore |
| − | + | B/A | Allow | B Only | Allow | Ignore |
| + | − | Allow | A/B | Allow | A Only | Ignore |
| − | − | No Svc | No Svc | No Svc | No Svc | Ignore |
| X | − | No Svc | No Svc | Ignore | No Svc | Ignore |
| − | X | No Svc | No Svc | No Svc | Ignore | Ignore |

Service Availability
X No service available
+ Positive SID (not on list)
− Negative SID (on list)

Figure 13A:
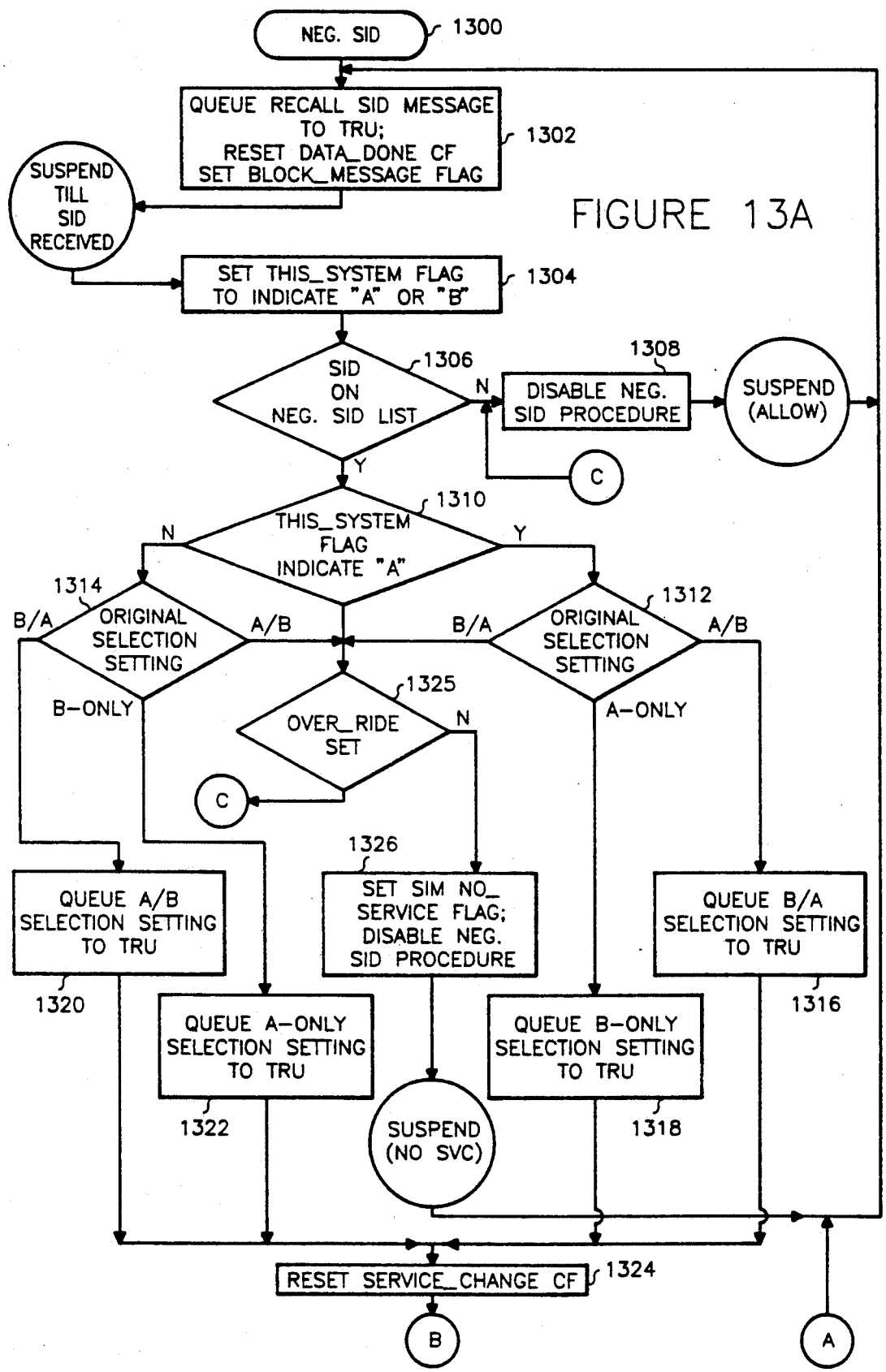
FIGS. 13A and 13B together show a flow chart of a negative system identification number (Neg SID) application procedure performed by the RPU portion of the present invention.
Figure 13B:
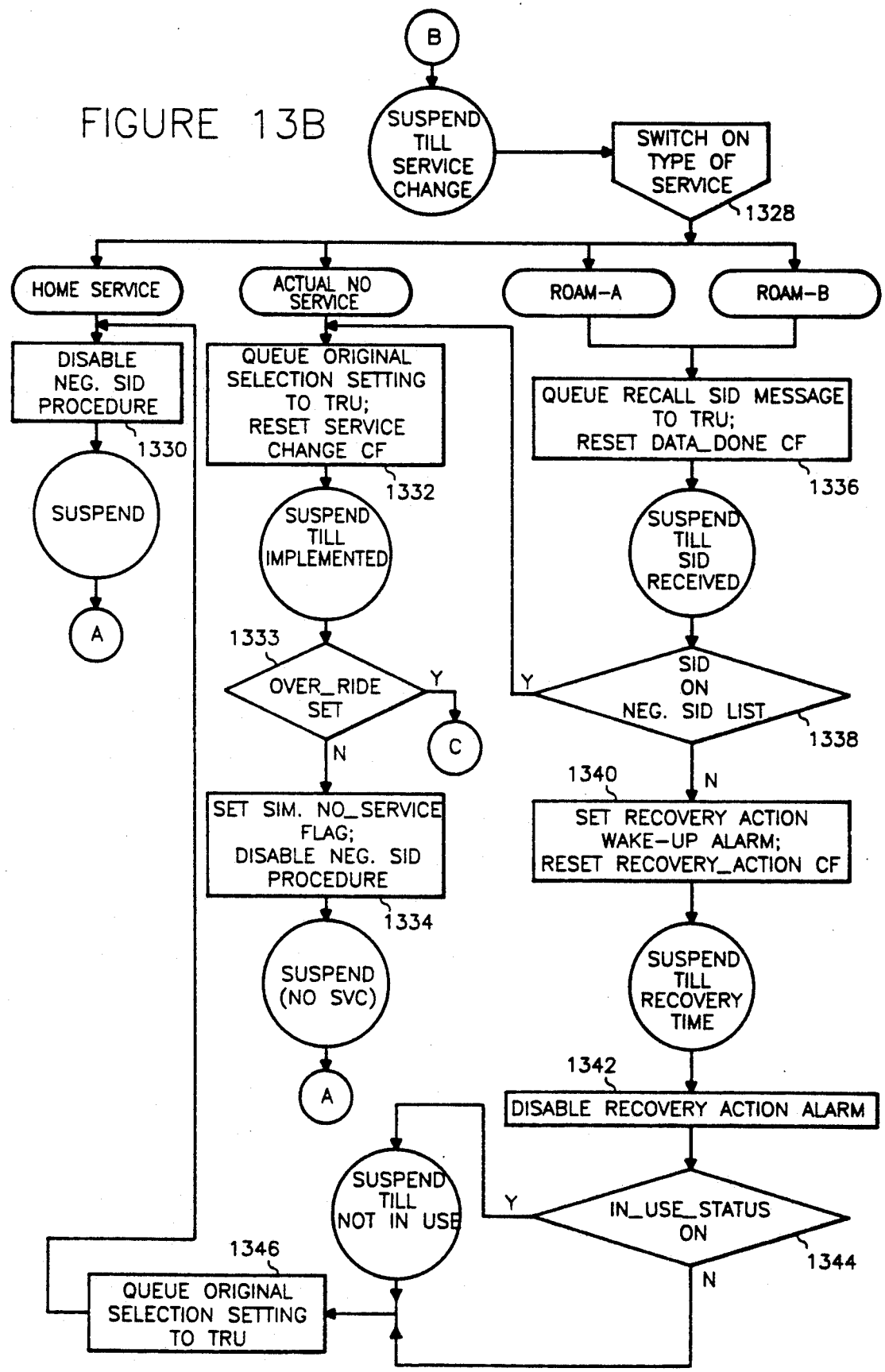

Actions
Ignore     No SID monitoring performed
Allow      Do not change existing selection setting
B/A        Force selection setting to B/A
A/B        Force selection setting to A/B
A Only     Force selection setting to A Only
B Only     Force selection setting to B Only
No Svc     Force a simulated no service condition if an Over_Ride flag is not set FIGS. 13A and 13B collectively present a flow chart which describes how Neg SID procedure 1300 produces the results listed in TABLE II. The connectors labeled "A", "B", and "C" in FIGS. 13 represent common nodes of this flow chart program control enters Neg SID procedure 1300 after a roaming state has been detected. Thus, TRU 62 has already selected a cellular system upon which to operate. Of course, at this point the selected cellular system is available to engage in communications with CMR 12, and CMR 12 is not in the above-discussed actual no service condition.

Upon entering Neg SID procedure 1300, a task 1302 queues a "recall SID" message to TRU 62, sets the Block_Message flag, and resets the Data_Done CF. After task 1302, procedure 1300 suspends operation by returning program control to executive 800 (see FIG. 8). By queuing this message to the TRU-Out procedure discussed above in connection with FIG. 7, the message will eventually be sent to TRU 62. In response, TRU 62 will send a data message toward CU 42 where it will be intercepted by RPU 48 and acted upon by RCMD procedure 1200 (see FIG. 12). Because the Block_Message flag is set, RCMD procedure 1200 does not pass the message on to CU 42 (see TABLE I). When the entire SID has been received and placed in a data buffer by RCMD procedure 1200, the Data_Done CF is set. Executive 800 then routes program control back to Neg SID procedure 1300 at a task 1304.

Task 1304 sets a This_System flag to record whether the SID that was just received belongs to an A type of cellular system or a B type of cellular system. As discussed above, A systems communicate on a first set of frequencies, B systems communicate on a second set of frequencies., and the first and second sets of frequencies are chosen so that interference is avoided. Those skilled in the art of cellular radiotelephony will appreciate that the SID number itself indicates whether the cellular system it identifies is an A or B system. Specifically, odd SIDs indicate A type systems, and even SIDs indicate B type systems.

Figure 14:
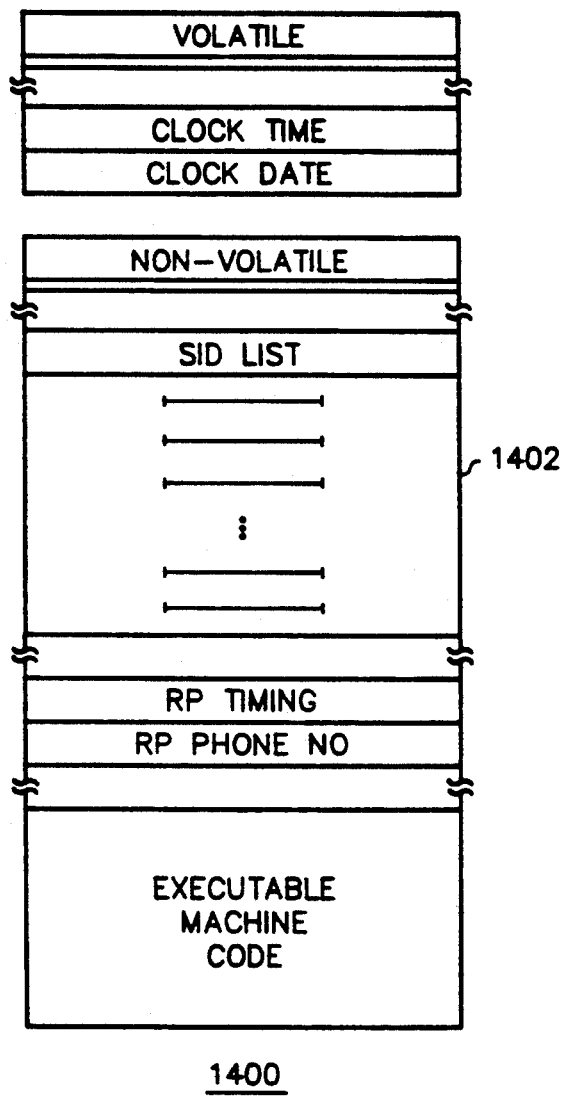
FIG. 14 shows a diagram of data items utilized by the RPU portion of the present invention and programmed during remote programming (RP) sessions.

Next, an inquiry task 1306 determines whether this SID is on a SID list 1402, shown in FIG. 14. FIG. 14 shows portions of a memory map 1400 maintained within memories 70-72 of RPU 48 (see FIG. 3). One of the items stored in a non-volatile portion of memories 70-72 is SID list 1402. List 1402 is programmed or written using data periodically supplied from RP host 22 (see FIG. 1) during remote programming sessions, discussed below in connection with FIG. 15. Through such remote programming sessions, list 1402 is maintained in a relatively current state in accordance with the latest information.

In particular, the information stored in SID list 1402 represents a collection of SID numbers. Preferably, this list is sorted so that task 1306 may quickly determine whether a SID is included in the list. In the preferred embodiment, the SIDs included in SID list 1402 identify those cellular systems 14 or 16 (see FIG. 1) for which communication with CMR 12 is to be prevented. In other words, the SIDs on list 1402 are referred to as "negative" SIDs since CMR 12 is prevented from communicating with these systems. By being able to identify systems with which roaming communication may be prevented, and by being able to periodically update information describing such systems, the present invention restores the ability to make purchasing decisions about providers of roaming cellular telecommunication services. Moreover, since such information may be automatically supplied to CMR 12, the customer or operator of CMR 12 need not obtain the information needed to make these purchasing decisions. Rather, such information may be gathered centrally by the operators of RP host 22 and used for the benefit of all client CMRs 12 on system 10 (see FIG. 1).

With reference back to FIG. 13, when task 1306 determines that the SID for the cellular system upon which CMR 12 is currently prepared to operate is not on SID list 1402, a task 1308 disables Neg SID procedure 1300 so that it will not be performed again until the next time that the system status changes to a roaming state. After task 1308, program control returns to executive 800. When program control does eventually come back to Neg SID procedure 1300, it will be routed to task 1302, discussed above. At this point in Neg SID procedure 1300, the default system selection process used by TRU 62 has not been altered, and the Sim_No_Service flag has not been set. Consequently, CMR 12 continues to operate as if Neg SID procedure 1300 had not been invoked at all. In other words, this exit from Neg SID procedure 1300 produces the "Allow" action listed above in TABLE II.

When task 1306 determines that the SID for the cellular system upon which CMR 12 is currently prepared to operate is on SID list 1402 (see FIG. 14), an inquiry task 1310 routes program control in a direction determined by the This_System flag. The This_System flag identifies the current system as being either an A or B system. When the current system is an A system, an inquiry task 1312 further investigates the Original_Selection_Setting variable to route program control based on the default process used by TRU 62 in selecting a cellular system. Likewise, when the current system is a B system, an inquiry task 1314 uses the Original_Selection_Setting variable to route program control based on the default process used by TRU 62. As a result of tasks 1310 and 1312, a task 1316 queues a "B/A selection setting" message to TRU 62, or a task 1318 queues a "B-Only selection setting" message to TRU 62. As a result of tasks 1310 and 1314, a task 1320 queues an "A/B selection setting" message to TRU 62, or a task 1322 queues an "A-Only" selection setting"message to TRU 62. The messages queued by tasks 1316-1322 cause TRU 62 to drop its default cellular system selection process and switch to the process identified by the message. After process 1300 performs one of tasks 1316-1322, a task 1324 resets the Service_Change CF so that program control may be suspended from procedure 1300 and routed back to procedure 1300 when the selection message queued by tasks 1316-1322 takes effect.

When the current SID is on SID list 1402 (see FIG. 14), when the current system is an A system, and when the original system selection process is the B/A process, program control is routed to a task 1325. Likewise, when the current SID is on SID list 1402, when the current system is a B system, and when the original system selection process is the A/B process, program control is routed to inquiry task 1325.

Task 1325 determines the state of an Over_Ride flag included in memory map 1400 (see FIG. 14). The Over_Ride flag is programmed using data periodically supplied from RP host 22 (see FIG. 1) during remote programming sessions, discussed below in connection with FIG. 15. Thus, it represents a programmable feature of CMR 12. If the Over_Ride flag is not set, procedure 1300 continues to task 1326. If the Over_Ride flag is set, program control proceeds from task 1325 through task 1308, discussed above, to exit procedure 1300. When program control is routed from task 1325 to task 1308, the customer is allowed access to the only available system even though that system's SID appears on SID list 1402. This will result in higher costs to the customer, but some customers may choose to pay this higher cost rather than experience the simulated no service condition. The customer's choice is communicated through the programming of the Over_Ride flag.

Task 1326 sets the Sim_No_Service flag and disables Neg SID procedure 1300. After task 1326, program control exits Neg SID procedure 1300 to executive 800 (see FIG. 8). At this exit from Neg SID procedure 1300, CMR 12 has determined that the only system available for communications is on its SID List 1402. Consequently, CMR 12 simulates operation of the actual no service condition, as discussed above in connection with FCMD and RCMD procedures 1100 and 1200, respectively. As discussed above, CMR 12 resets the Sim_No_Service flag when an actual no service condition exists. At that point, the simulation stops and operation in the actual no service mode of operation commences.

When one of tasks 1316-1322 causes TRU 62 to alter its original system selection process, program control returns to a switching task 1328 when that altered system selection process takes effect (see FIG. 13B). Task 1328 routes program control based on the type of service that results from the change in the system selection process.

For example, when home service results, a task 1330 disables Neg SID procedure 1300 and suspends operation. Home service results from operation on the home system of CMR 12. CMR 12 will subsequently operate on its home system. Neg SID procedure 1300 should not often experience a switch to home service because TRU 62 should choose home service whenever it is available. Nevertheless, task 1330 is included for completeness.

When an actual no service condition results from changing the system selection process used by TRU 62, a task 1332 queues a message to TRU 62 that commands TRU 62 to return to the original system selection setting. In addition, task 1332 resets the Service_Change CF. After task 1332, procedure 1300 suspends operation until the Service_Change CF changes to a set state to indicate that the service selection process setting change has been implemented. Upon return to process 1300, an inquiry task 1333 determines the state of the Over_Ride flag (see FIG. 14). If the Over_Ride flag is set, program control proceeds to task 1308 (see FIG. 13A), discussed above. Program control will then exit procedure 1300 allowing the original selection setting. If task 1333 finds the Over_Ride flag reset, a task 1334 sets the Sim_No_Service flag and disables Neg SID procedure 1300. After task 1334, procedure 1300 suspends operation, and program control returns to executive 800 (see FIG. 8). At this exit from procedure 1300, CMR 12 has determined that only cellular systems which are on SID list 1402 (see FIG. 14) are available. Moreover, the Over_Ride flag is reset. Thus, communication is prohibited and, even though at least one system is available, CMR 12 subsequently simulates the operation of the actual no service condition.

When a roaming condition results from changing the system selection process setting used by TRU 62, a task 1336 queues a message to TRU 62 that commands TRU 62 to return the SID of the newly selected system. Task 1336 also resets the Data_Done CF. As indicated in FIG. 13B, task 1336 is performed regardless of whether CMR 12 is now roaming on an A or B system. The operation of procedure 1300 is then suspended until the SID returns from TRU 62. When RPU 48 obtains the SID, an inquiry task 1338 determines whether this new SID is on SID list 1402 (see FIG. 14). When the new SID is on SID list 1402, procedure 1300 continues to task 1332, discussed above. As a result, the original system selection process setting will be restored to TRU 62. Moreover, depending on the state of the Over_Ride flag, the Sim_No_Service flag will be set to command FCMD and RCMD procedures 1100 and 1200, respectively, to simulate the actual no service condition.

When the New SID is not on SID list 1402, a task 1340 sets the recovery action wake-up alarm and resets the Recovery_Action CF, discussed above in connection with background procedure 1000 (see FIG. 10). This wake-up alarm is set to expire at a predetermined time, preferably 3-10 minutes in the future. Task 1340 may advantageously access the current clock maintained by timer procedure 500 (see FIG. 5) to determine the appropriate time to use in setting the recovery action wake-up alarm. After task 1340, procedure 1300 suspends operation until the recovery action alarm expires. When this alarm expires, a task 1342 disables the alarm so that the alarm will not interfere with subsequent operations of Neg SID procedure 1300.

After task 1342, an inquiry task 1344 determines whether CMR 12 is currently being used to make a call. This determination is made by examining the In_Use_Status flag maintained by RCMD procedure 1200 (see TABLE I). If CMR 12 is currently in use, procedure 1300 suspends operation until CMR 12 is no longer in use. When CMR 12 is not or no longer in use, a task 1346 queues a message to TRU 62 which commands TRU 62 to return to its original system selection process setting. After task 1346, task 1330 disables Neg SID procedure 1300, and Neg SID procedure 1300 suspends operation.

When the system selection process change takes effect in TRU 62, the tasks discussed above in connection with RCMD and Neg SID procedures 1200 and 1300, respectively, will force a re-evaluation of the cellular system (if any) upon which CMR 12 is then prepared to operate. If the CMR 12 is still roaming, RCMD procedure 1200 will again enable Neg SID procedure 1300, thereby causing RPU 48 to repeat procedure 1300.

As discussed above, background application procedure 1000 (see FIG. 10) monitors the current time to determine when to engage in a remote programming session. When this time occurs, procedure 1000 enables RP session procedure 1500. Executive 800 (see FIGS. 8–9) then routes program control to RP session procedure 1500 as soon as possible.

Figure 15:
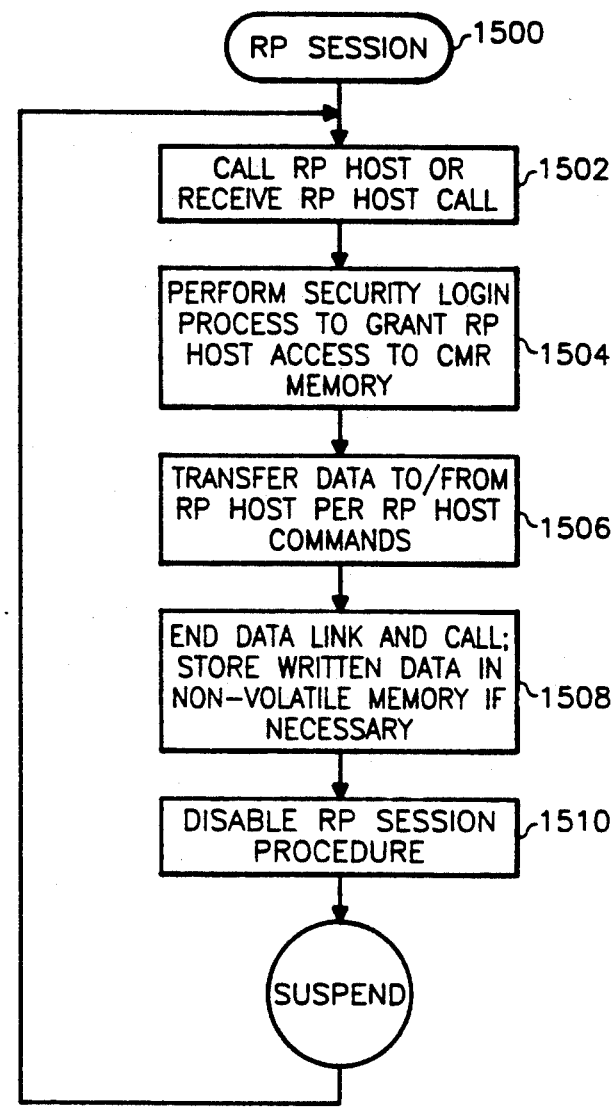
FIG. 15 shows a flow chart of an RP session application procedure performed by the RPU portion of the present invention.

FIG. 15 shows a flow chart of tasks performed within RP session procedure 1500. In a task 1502, CMR 12 establishes a call with RP host 22 (see FIG. 1). RPU 48 may apply power to TRU 62 prior to establishing the call if necessary by activating simulated output signal 60 (see FIGS. 2–3). As discussed in the above-listed related patents, this call may be placed by CMR 12 and answered by RP host 22 or placed by RP host 22 and answered by CMR 12. After task 1502, a task 1504 performs a security login process. This login process preferably requires RP host 22 to generate the unique dual ton login signal discussed above in connection with FIG. 3 and to provide CMR 12 with a password before CMR 12 will grant access to its memory space. During the login process, CMR 12 transfers its electronic serial number (ESN) to RP host 22 for use in generating the password. Accordingly, each CMR 12 has its own unique password that is preferably known only to RP host 22. Once RP host 22 logs into CMR 12, RP host 22 has access to memory space 1400 (see FIG. 14) of CMR 12.

Next, a task 1506 causes CMR 12 to perform data transfer operations to or from RP host 22 in accordance with commands issued from RP host 22. The data transfer operations take place through the Modem-In and Modem-Out procedures discussed above in connection with FIGS. 6 and 7, respectively. Thus, RP host 22 may read memory locations within CMR 12 and may write data to memory locations within CMR 12, including SID list 1402 (see FIG. 14). After task 1506, a task 1508 ends the session with RP host 22, drops the call, and stores any data within non-volatile memory 72 (see FIG. 3) which may require data storage action. After task 1508, a task 1510 disables RP session procedure 1500 so that it will not be invoked again until its next scheduled time. After task 1510, procedure 1500 suspends operation and program control returns to executive 800 (see FIG. 8).

In summary, the present invention provides an improved CMR and method of operating a CMR to select a desirable foreign cellular system with which to communicate. The CMR of the present invention is remotely programmable. Accordingly, a SID list is maintained at a central location, such as RP host 22, and periodically downloaded to the CMR so that the CMR keeps a current copy of the list. Preferably, the SID list reflects purchasing decisions for A and B types of cellular systems potentially usable by roamers. In the preferred embodiment, the list includes SIDs of those systems for which cellular telecommunication services are to be blocked. Thus, when the CMR is roaming and the SID of the system upon which the CMR is configured to operate is included in the SID list, the CMR automatically takes steps to avoid operation on that system. As a result, the present invention permits multiple CMRs that are clients of the host system to act collectively in obtaining roaming radiotelephone services.

The present invention has been described above with reference to a preferred embodiment. However, those skilled in the art will recognize that changes and modifications may be made in this preferred embodiment without departing from the scope of the present invention. For example, those skilled in the art may adapt the teaching of the present invention so that a transmit/-receive unit (TRU) incorporates the remote programming unit (RPU) features described herein. Likewise, the teaching of the present invention may be adapted to portable, roadside, and other cellular telephone equipment. In addition, nothing prevents adaption of the CMR and system described herein to incorporate additional capabilities and features. Such additional capabilities and features may further process data passed between a TRU and CU of a CMR. Furthermore, those skilled in the art will recognize that the various specific tasks and procedures described herein in connection with the preferred embodiment may be altered significantly without departing from the scope of the present invention. These and other changes and modifications which are obvious to those skilled in the art are intended to be included within the scope of the present invention.

What is claimed is:

1. A method of selecting upon which one of a plurality of frequency sets a cellular mobile radiotelephone (CMR) communicates, said method comprising the steps of:

storing a list of system identification numbers (SIDs) that identify cellular base systems for which cellular radiotelephone communication with said CMR is to be prohibited;

detecting when said CMR is roaming;

when said CMR is roaming, obtaining a SID for the cellular system upon which said CMR is currently configured to operate, said cellular system communicating upon a first one of said sets of frequencies;

determining whether said SID is identified by said list; and when said SID is identified by said list, instructing said CMR to communicate upon a second one of said sets of frequencies.

2. A method as claimed in claim 1 additionally comprising the steps of:
  periodically receiving revision data, said data being received at said CMR over one of said plurality of sets of frequencies; and
  storing said data in said list of SIDs, said receiving and storing steps operating to maintain said list in a current state.

3. A method as claimed in claim 1 wherein:
  prior to said detecting step, said CMR operates in an original system selection mode;
  said instructing step causes said CMR to operate in an altered system selection mode; and
  when said SID is not identified by said list, said method comprises the step of continuing operation of said CMR in said original system selection mode.

4. A method as claimed in claim 1 wherein, when communication services are unavailable, said CMR operates in an unavailability mode of operation which prevents transmissions away from said CMR, and said method additionally comprises, when said SID is identified by said list, the steps of:
  determining whether communication services are available over said second frequency set;
  when said communication services are unavailable, instructing said CMR to communicate upon said first frequency set; and
  operating said CMR in a mode of operation that simulates said unavailability mode.

5. A method as claimed in claim 4 additionally comprising, the steps of:
  monitoring operation of said CMR upon said first frequency set to determine when communication services become actually unavailable; and
  terminating said simulation of said unavailability mode when said communication services become actually unavailable.

6. A method as claimed in claim 4 wherein said operating step comprises the step of permitting said CMR to place emergency calls in spite of said simulation of said unavailability mode.

7. A method as claimed in claim 1 wherein, when communication services are actually unavailable, said CMR operates in an unavailability mode of operation which prevents transmissions away from said CMR, and said method additionally comprises, when said SID is identified by said list, the steps of:
  determining whether communication services are available over said second frequency set;
  when said communication services are available, obtaining a SID for a second cellular system which communicates using said second frequency set;
  determining whether said second system SID is identified by said list; and
  when said second system SID is identified by said list, simulating CMR operation in said unavailability mode.

8. A method as claimed in claim 7 wherein said obtaining a SID for said second cellular system step is performed only when said CMR is roaming with respect to said second cellular system.

9. A method as claimed in claim 7 additionally comprising, when said second system SID is identified by said list, the steps of:
  monitoring operation of said CMR to determine when communication services become actually unavailable; and
  terminating said simulation of said unavailability mode when said communication services become actually unavailable.

10. A method as claimed in claim 9 additionally comprising, when said second system SID is identified by said list, the step of instructing said CMR to communicate upon said first set of frequencies.

11. A method as claimed in claim 1 wherein said method additionally comprises, when said SID is identified by said list, the steps of:
  determining whether communication services are available over said second frequency set;
  when said communication services are available, getting a SID for a second cellular system which communicates using said second frequency set;
  inquiring whether said second system SID is identified by said list; and
  when said second system SID is not identified by said list, waiting a predetermined period of time then instructing said CMR to communicate upon said first set of frequencies; and
  repeating said obtaining, and determining steps.

12. A method of preventing a cellular mobile radiotelephone (CMR) that is capable of performing a plurality of cellular system selection processes from operating upon a predetermined set of cellular systems, said method comprising the steps of:
  periodically receiving data at said CMR, said data identifying at least one cellular system;
  storing said data in a list within a memory portion of said CMR;
  performing a first one of said cellular system selection processes to select a first cellular system upon which said CMR may operate;
  obtaining a system identification number (SID) of said first cellular system;
  comparing said SID against said list to determine whether said CMR is prevented from operating upon said first cellular system; and
  when said comparing step determines that said CMR is prevented from operating upon said first cellular system, performing a second one of said cellular system selection processes.

13. A method as claimed in claim 12 additionally comprising the steps of:
  detecting when said CMR is roaming with respect to said cellular system selected in accordance with said first process; and
  omitting said comparing step when said CMR is not roaming.

14. A method as claimed in claim 12 wherein:
  when one of said selection processes fails to detect a cellular system with which said CMR may communicate, said CMR operates in an unavailability mode of operation; and
  said method additionally comprises, when said comparing step determines that said CMR is prevented from operating upon said first cellular system, the steps of:
    determining whether said second one of said processes detects a second cellular system with which said CMR may communicate;
    when said second cellular system is not detected, performing said first process; and
    operating said CMR in a mode of operation that simulates said unavailability mode.

15. A method as claimed in claim 14 wherein said operating step comprises the step of permitting said CMR to place emergency calls in spite of said simulation of said unavailability mode.

16. A method as claimed in claim 14 additionally comprising the steps of:

monitoring the performance of said first process to determine when said first process fails to detect a cellular system with which said CMR may communicate; and terminating said simulation of said unavailability mode when said first process fails to detect a cellular system with which said CMR may communicate.

17. A method as claimed in claim 12 wherein:

when one of said selection processes fails to detect a cellular system with which said CMR can communicate, said CMR operates in an unavailability mode of operation; and said method additionally comprises, when said comparing step determines that said CMR is prevented from operating upon said first cellular system, the steps of:

determining whether said second one of said processes detects a second cellular system with which said CMR can communicate;

when said second cellular system is detected, obtaining a system identification number (SID) of said second cellular system;

comparing said second system SID against said list to determine whether said CMR is prevented from operating upon said second cellular system; and when said second system comparing step determines that said CMR is prevented from operating upon said second cellular system, simulating CMR operation in said unavailability mode.

18. A method as claimed in claim 17 wherein said comparing said second system SID step is performed only when said CMR is roaming with respect to said second cellular system.

19. A method as claimed in claim 17 additionally comprising, when said second system comparing step determines that said CMR is prevented from operating upon said second cellular system, the steps of:

monitoring the performance of one of said first and second processes to determine when said one process fails to detect a cellular system with which said CMR can communicate; and terminating said simulation of said unavailability mode when said one process fails to detect a cellular system with which said CMR can communicate.

20. A method as claimed in claim 12 wherein said method additionally comprises, when said comparing step determines that said CMR is prevented from operating upon said first cellular system, the steps of:

determining whether said second one of said processes detects a second cellular system with which said CMR can communicate;

when said second cellular system is detected, obtaining a SID of said second cellular system;

inquiring whether said second system SID identifies a cellular system upon which said CMR is prevented from operating;

when said CMR is not prevented from operating upon said second cellular system, waiting a predetermined period of time then performing said first cellular system selection process; and repeating said obtaining, and comparing steps.

21. A method of selecting upon which one of a plurality of frequency sets a cellular mobile radiotelephone (CMR) communicates, said method comprising the steps of:

periodically receiving data, said data being received at said CMR over one of said plurality of sets of frequencies;

storing said data in a list of system identification numbers (SIDs) that identify cellular systems for which cellular radiotelephone communication with said CMR is to be prohibited, said receiving and storing steps operating to maintain said list in a current state;

detecting when said CMR is roaming;

when said CMR is roaming, obtaining a SID for the cellular system upon which said CMR is currently configured to operate, said cellular system communicating upon a first one of said sets of frequencies;

determining whether said SID is identified by said list;

when said SID is identified by said list, instructing said CMR to communicate upon a second one of said sets of frequencies;

determining whether communication services are available over said second frequency set;

when said communication services are available, getting a SID for a second cellular system which communicates using said second frequency set;

inquiring whether said second system SID is identified by said list;

when said second system SID is not identified by said list, waiting a predetermined period of time, then instructing said CMR to communicate upon said first set of frequencies; and repeating said obtaining, and determining steps.

22. A method as claimed in claim 21 wherein, when communication services are unavailable, said CMR operates in an unavailability mode of operation which prevents transmissions away from said CMR, and said method additionally comprises:

when said communication services are unavailable over said second set of frequencies, instructing said CMR to communicate upon said first frequency set; and operating said CMR in a mode of operation that simulates said unavailability mode.

* * * * *